US008417682B2

(12) United States Patent
Wilcox et al.

(10) Patent No.: US 8,417,682 B2
(45) Date of Patent: Apr. 9, 2013

(54) VISUALIZATION OF ATTRIBUTES OF WORKFLOW WEBLOGS

(75) Inventors: Eric Wilcox, Cambridge, MA (US); Sandra Louise Kogan, Newton, MA (US); Martin Miles Wattenberg, Winchester, MA (US)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 11/117,233

(22) Filed: Apr. 28, 2005

(65) Prior Publication Data
US 2005/0198021 A1    Sep. 8, 2005

Related U.S. Application Data

(63) Continuation-in-part of application No. 10/960,877, filed on Oct. 7, 2004, now Pat. No. 8,140,691, which is a continuation-in-part of application No. 10/735,087, filed on Dec. 12, 2003.

(51) Int. Cl.
*G06F 7/00* (2006.01)
*G06F 17/00* (2006.01)

(52) U.S. Cl.
USPC ........................................................ 707/705

(58) Field of Classification Search ...... 707/3; 709/100; 705/10
See application file for complete search history.

(56) References Cited

U.S. PATENT DOCUMENTS

| | | | |
|---|---|---|---|
| 5,553,235 A * | 9/1996 | Chen et al. ................ | 714/20 |
| 5,911,143 A | 6/1999 | Deinhart et al. | |
| 5,982,369 A * | 11/1999 | Sciammarella et al. ...... | 715/835 |
| 5,999,911 A | 12/1999 | Berg et al. | |
| 6,067,548 A * | 5/2000 | Cheng ................ | 1/1 |
| 6,088,679 A | 7/2000 | Barkley | |
| 6,202,066 B1 | 3/2001 | Barkley et al. | |
| 6,453,353 B1 | 9/2002 | Win et al. | |
| 6,539,404 B1 | 3/2003 | Ouchi | |
| 6,615,199 B1 * | 9/2003 | Bowman-Amuah ........ | 706/50 |
| 6,651,033 B2 | 11/2003 | Nemoto et al. | |
| 6,823,513 B1 | 11/2004 | McNally et al. | |
| 6,947,989 B2 | 9/2005 | Gullotta et al. | |
| 6,968,343 B2 | 11/2005 | Charisius et al. | |
| 7,027,997 B1 | 4/2006 | Robinson et al. | |
| 7,069,003 B2 | 6/2006 | Lehikoinen et al. | |
| 7,308,702 B1 | 12/2007 | Thomsen et al. | |
| 7,546,346 B2 | 6/2009 | Ouchi | |
| 7,653,692 B2 | 1/2010 | Creamer et al. | |

(Continued)

OTHER PUBLICATIONS

Google Blog Search, Google, accessed Aug. 18, 2008, produce/service developed circa 2004, pp. 1-5.*
Technorati, accessed Aug. 18, 2008, Wikipedia, product/service developed circa 2004, p. 1.*
Bouguettaya et al., Supporting dynamic interactions among web-based information sources, Sep. 2000, vol. 12 issue 5, pp. 779-801.*
Hao et al.; "Visualization of Directed Associations in E-Commerce Transaction Data"; Hewlett Packard Research Laboratories; Palo Alto, CA; pp. 1-7.

(Continued)

*Primary Examiner* — Pierre Vital
*Assistant Examiner* — Taelor Kim
(74) *Attorney, Agent, or Firm* — Guerin & Rodriguez, LLP

(57) ABSTRACT

Described is a method for visualization of attributes of workflow weblogs. A group of workflow weblogs is searched to find weblogs that have an attribute that satisfies a search condition. The group of workflow weblogs can include instantiations of a single workflow. Attributes are displayed for each of the weblogs found by the search. An attribute is displayed using a modified graphical parameter if the attribute satisfies a predefined condition for the attribute type. The modified graphical parameter can include modified text or a modified graphical structure.

8 Claims, 8 Drawing Sheets

U.S. PATENT DOCUMENTS

| | | | |
|---|---|---|---|
| 7,844,492 | B2 | 11/2010 | Perkowski et al. |
| 2002/0010741 | A1* | 1/2002 | Stewart et al. ............... 709/204 |
| 2002/0049627 | A1* | 4/2002 | Goli et al. ....................... 705/10 |
| 2002/0070953 | A1* | 6/2002 | Barg et al. ..................... 345/700 |
| 2002/0075293 | A1* | 6/2002 | Charisius et al. ............. 345/704 |
| 2002/0087679 | A1 | 7/2002 | Pulley et al. |
| 2002/0099701 | A1* | 7/2002 | Rippich ............................ 707/5 |
| 2002/0103797 | A1* | 8/2002 | Goel et al. ........................ 707/5 |
| 2002/0120711 | A1* | 8/2002 | Bantz et al. ................... 709/217 |
| 2002/0152254 | A1* | 10/2002 | Teng .............................. 709/100 |
| 2002/0174087 | A1 | 11/2002 | Hao et al. |
| 2003/0018508 | A1 | 1/2003 | Schwanke |
| 2003/0018702 | A1* | 1/2003 | Broughton et al. ........... 709/202 |
| 2003/0023675 | A1 | 1/2003 | Ouchi et al. |
| 2003/0046134 | A1 | 3/2003 | Frolick et al. |
| 2003/0051033 | A1 | 3/2003 | Kusumoto et al. |
| 2003/0061266 | A1 | 3/2003 | Ouchi |
| 2003/0110249 | A1 | 6/2003 | Buus et al. |
| 2003/0135565 | A1 | 7/2003 | Estrada |
| 2003/0144868 | A1 | 7/2003 | MacIntyre et al. |
| 2003/0187719 | A1 | 10/2003 | Brocklebank |
| 2003/0195763 | A1* | 10/2003 | Gulcu et al. ...................... 705/1 |
| 2004/0002950 | A1* | 1/2004 | Brennan et al. .................. 707/1 |
| 2004/0015821 | A1 | 1/2004 | Lu et al. |
| 2004/0019799 | A1 | 1/2004 | Vering et al. |
| 2004/0054690 | A1* | 3/2004 | Hillerbrand et al. ........ 707/104.1 |
| 2004/0162906 | A1 | 8/2004 | Griffin et al. |
| 2005/0027651 | A1* | 2/2005 | DeVault ........................... 705/38 |
| 2005/0033777 | A1* | 2/2005 | Moraes et al. ................. 707/202 |
| 2005/0114347 | A1* | 5/2005 | Wesinger et al. ............... 707/10 |
| 2005/0182773 | A1 | 8/2005 | Feinsmith |
| 2005/0246193 | A1 | 11/2005 | Roever et al. |
| 2005/0257158 | A1* | 11/2005 | Lombardo ..................... 715/751 |
| 2005/0289163 | A1* | 12/2005 | Gordon et al. ................. 707/100 |
| 2006/0004691 | A1* | 1/2006 | Sifry ................................. 707/1 |
| 2006/0122876 | A1* | 6/2006 | Von Schweber et al. ........ 705/10 |
| 2006/0173985 | A1* | 8/2006 | Moore ........................... 709/223 |
| 2006/0277089 | A1 | 12/2006 | Hubbard et al. |
| 2007/0094076 | A1 | 4/2007 | Perkowski et al. |
| 2007/0250478 | A1* | 10/2007 | Copperman ....................... 707/3 |
| 2007/0250492 | A1* | 10/2007 | Angel et al. ....................... 707/4 |

OTHER PUBLICATIONS blogosphere.us/February 27, 2004; 7 pgs; http://www.blogosphere.us.

Technorati, accessed Feb. 19, 2009 via Wikipedia, pp. 1-3.

Non-Final Office Action mailed May 8, 2008 in related U.S. Appl. No. 10/735,087 entitled "Method for Tracking the Status of a Workflow Using Weblogs".

Agnew, Marion, "Collaboration on the Desktop", InformationWeek, Jul. 10, 2000, 6 pages.

White, Martin, "CMS Implementation—Project Management", EContent, vol. 25, No. 11, Nov. 2002, 3 pages.

Gillmor, Dan, "RSS Starting to Catch on", Computerworld, vol. 37, No. 30, Jul. 28, 2003, 2 pages.

Arnold, Stephen E., "Social Software", Searcher, vol. 11, No. 9, Oct. 2003.

Vu, Uyen, "How Online Diaries Change Knowledge Management", Canadian HR Reporter, vol. 16, No. 18, Oct. 20, 2003.

"RSS Definition", Wikipedia.org, retrieved May 1, 2008.

"Weblog Definition" Dictionary.com.

"Weblog Definition" Google.com.

Final Office Action mailed Nov. 25, 2008 in related U.S. Appl. No. 10/735,087 entitled "Method for Tracking the Status of a Workflow Using Weblogs".

Laplante, Alice, "Taligent Electronic Bulletin Board is a Workhorse", InfoWorld, vol. 15, No. 19, May 10, 1993.

"Teamware Flow 3.1 User's Guide", TeamWare Group, Apr. 2000.

"ActionWorkflow Enterprise Series 3.0 Process Builder User's Guide", Action Technologies, Inc., 1996.

Non-Final Office Action mailed May 14, 2009 in related U.S. Appl. No. 10/735,087 entitled "Method for Tracking the Status of a Workflow Using Weblogs".

Udell, Jon, "Internet Groupw for Scientific Collaboration", 2000.

Udell, Jon, "Telling a Story: The Weblog as a Project Management Tool", May 24, 2001, 6 pages.

Udell, Jon, "Publishing a Project Weblog", InfoWorld, Mar. 28, 2003, 3 pages.

McGee, "Weblogs and Knowledge Management, Part 2", McGee's Musings, May 27, 2003, 5 pages.

Diehl, Mike, "Mike Diehl's Weblog: Blogging for Project Management", Nov. 28, 2003, 1 page.

Callaghan, Dennis, "IBM Previews Blogging Tool; IBM is Throwing More Weight . . . ", eWeek, vol. 22, No. 28, Jul. 18, 2005, 1 page.

Rath, Doug, "Objects Ease Workflow: A Closer Look at Tempest", http://www.internetwk.com/lead/lead062599a, Jun. 25, 1999, 2 pages.

Windley, Phillip J., "Blogs for Project Management", http://www.windley.com/2003106/04, Jun. 4, 2003, 2 pages.

"Using Weblogs to Manage IT", Jun. 3, 2003, 2 pages.

"Blogs for IT Management—Follow-Up", Jun. 6, 2003, 2 pages.

Final Office Action mailed Mar. 26, 2010 in related U.S. Appl. No. 10/735,087 entitled "Method for Tracking the Status of a Workflow Using Weblogs".

Pyron et al, "Special Edition: Using Microsoft Project 2000", Que, ISBN 9780789722539, Oct. 7, 2000, 5 pages.

"Web Crossing Inc. Release New Weblog Plug-In", Business Wire, Sep. 3, 2003, 3 pages.

Tari, Zahir, et al., "A Role Base Access Control for Intranet Security", IEEE Internet Computing, 1997, 11 pages.

Lindahl, Charlie et al., "Weblogs: Simplifying Web Plublishing", Computer, Nov. 2003, 3 pages.

Stone, Biz, "Blogging: Genius Strategies for Instant Web Connect", New Riders, ISBN: 0735712999, Sep. 11, 2002, 120 pages.

Doctorow, Cory et al., "Essential Blogging" O'Riley, ISBN: 0596003889, Sep. 2002, 9 pages.

Landon, Deb et al., "Deploying Lotus Sametime on the IBM eserver iSeries Server", IBM Redbooks, Jun. 2002, 134 pages.

Non-Final Office Action mailed Jul. 27, 2010 in related U.S. Appl. No. 10/735,087 entitled "Method for Tracking the Status of a Workflow Using Weblogs".

Paquet, Sebastien et al., "A Topic Sharing Infrastructure Network for Weblog Networks", Second Annual Conference on Communication Networks and Services Research, 2004, 4 pages.

Saunders, Christopher, "Merging IM With Blogging", InstantMessagingPlanet, Jul. 3, 2003, 5 pages.

Final Office Action mailed Feb. 28, 2011 in related U.S. Appl. No. 10/735,087 entitled "Method for Tracking the Status of a Workflow Using Weblogs".

"Security for Microsoft Project Central (Microsoft Project 2000)", Microsoft TechNet, 2000, 18 pages.

Non-Final Office Action mailed Apr. 21, 2008 in related U.S. Appl. No. 10/960,877 entitled "Role-Based Views Access to a Workflow Weblog".

Final Office Action mailed Sep. 25, 2008 in related U.S. Appl. No. 10/960,877 entitled "Role-Based Views Access to a Workflow Weblog".

Final Office Action mailed Dec. 30, 2008 in related U.S. Appl. No. 10/960,877 entitled "Role-Based Views Access to a Workflow Weblog".

Non-Final Office Action mailed Jun. 8, 2009 in related U.S. Appl. No. 10/960,877 entitled "Role-Based Views Access to a Workflow Weblog".

Final Office Action mailed Mar. 1, 2010 in related U.S. Appl. No. 10/960,877 entitled "Role-Based Views Access to a Workflow Weblog".

Non-Final Office Action mailed Aug. 3, 2010 in related U.S. Appl. No. 10/960,877 entitled "Role-Based Views Access to a Workflow Weblog".

Final Office Action mailed Jan. 19, 2011 in related U.S. Appl. No. 10/960,877 entitled "Role-Based Views Access to a Workflow Weblog".

Non-Final Office Action mailed Jun. 7, 2011 in related U.S. Appl. No. 10/960,877 entitled "Role-Based Views Access to a Workflow Weblog".

* cited by examiner

INTERDEPARTMENTAL RESEARCH MEETING

VISUALIZATION OF ATTRIBUTES OF WORKFLOW WEBLOGS

RELATED APPLICATIONS

This application is a continuation-in-part application claiming priority to co-pending U.S. patent application Ser. No. 10/735,087, filed Dec. 12, 2003, titled "Method for Tracking the Status of a Workflow Using Weblogs" and co-pending U.S. patent application Ser. No. 10/960,877, filed Oct. 7, 2004, titled "Role-Based Views Access to a Workflow Weblog," the entirety of which applications are incorporated by reference herein.

FIELD OF THE INVENTION

The invention relates generally to visualization of search results. In particular, the invention relates to a method for visually presenting attributes of weblogs used to track workflow processes.

BACKGROUND OF THE INVENTION

Business processes and workflows are typically managed using multiple forms of communications and organization. For example, e-mail is commonly used to inform individuals associated with a business workflow of the occurrence of important events and required actions. In other instances the communications are verbal. Project management software is used to specify the various steps, or tasks, to be performed and to track the completion of these steps. Workflow software packages exist but are not integrated with the user's e-mail, other software or the user's Workplace. No common form of workflow management exists that centralizes, stores and tracks all communications for practical oversight of the workflow.

When a problem arises with a workflow, a typical response includes contacting individuals responsible for different tasks to determine details of the problem, to determine what actions are being taken to correct the problem and to determine what activity preceded and/or caused the problem. Individuals responsible for the workflow or a step or task in the workflow may review numerous written communications, such as status reports and e-mails, to find relevant information. In some instances the audit process may prove fruitless as there may not be any recorded information that relates to the problem. In other instances it can be difficult to determine who performed a step and when the step was performed.

Weblogs can be used to track the status of a workflow and serve as an easily accessible central repository for all workflow-related materials such as posts, comments, data, documents, links and the like. Currently, users are limited in their ability to compare, contrast and search instances of workflow processes. Existing weblog searches are generally limited to determining keyword frequency over a large number of weblogs but are not useful in comparing and contrasting information between weblogs. Moreover, typical database queries result in lists of monochromatic data. As more processes are automated, access and management of prior workflow processes becomes more difficult.

What is needed is a method for users to isolate, contrast and relate the characteristics of individual workflows or workflow instances in a group of workflows or workflow instances. The present invention satisfies this need and provides additional advantages.

SUMMARY OF THE INVENTION

In one aspect, the invention features a method for visualization of attributes of a workflow weblog. At least one workflow weblog having an attribute that satisfies a search condition is determined from a group of workflow weblogs. A plurality of attributes is displayed for each of the workflow weblogs in the group that matches the search condition. Each of the displayed attributes has a modified graphical parameter if the displayed attribute satisfies a respective predefined condition.

In another aspect, the invention features a computer program product for use with a computer system. The computer program product comprises a computer useable medium having embodied therein program code comprising program code for determining from a group of workflow weblogs at least one workflow weblog having an attribute that satisfies a search condition, and program code for displaying a plurality of attributes for each of the workflow weblogs in the group that matches the search condition. Each of the displayed attributes has a modified graphical parameter if the displayed attribute satisfies a respective predefined condition.

In yet another aspect, the invention features a system for visualization of attributes of a workflow weblog. The system includes a weblog processor and a user interface. The weblog processor determines from a group of workflow weblogs at least one workflow weblog that has an attribute that satisfies a search condition. The user interface enables entry of the search condition by a user and display of a plurality of attributes for each of the workflow weblogs in the group of workflow weblogs that matches the search condition. Each of the displayed attributes has a modified graphical parameter if the displayed attribute satisfies a respective predefined condition.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

FIG. 3 is an illustration of an exemplary personal weblog for monitoring workflow status and posting weblog entries.

FIG. 4 is an illustration of an exemplary aggregator view for monitoring multiple weblog feeds, including workflow processes.

DETAILED DESCRIPTION

Figure 1:
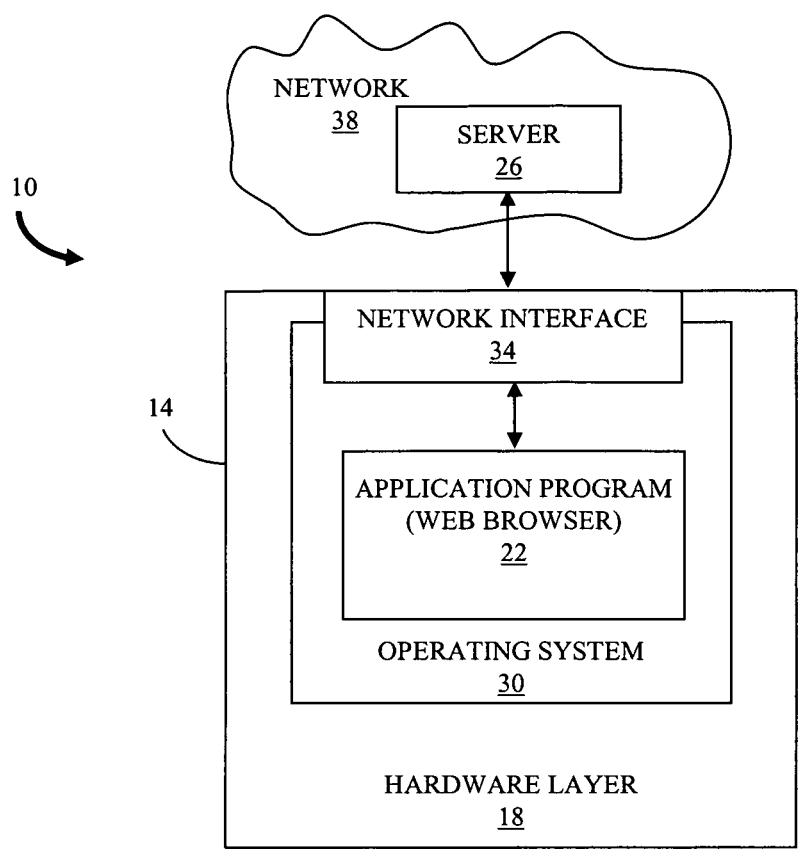
FIG. 1 is a block diagram of an embodiment of a computing system for tracking the status of a workflow according to the invention.

In brief overview, the present invention relates to a method for visualization of attributes of a workflow weblog. One or more workflow weblogs are identified from a group of workflow weblogs if an associated attribute satisfies a search condition. The search condition can be based on a matching of one or more keywords, a defined requirement for an attribute value based on logical or mathematical operators, and the like. The search condition can be a combination of conditions to be satisfied. Attributes for each of the workflow weblogs in the group that satisfy the search condition are displayed. Attributes can be examined against predefined conditions and displayed with a modified graphical parameter if the condition is satisfied. Modifications to graphical parameters can include changes to text presentation and graphical elements as described in more detail below.

Users can more generally conduct searches across workflow definitions, workflow instances, workflow types and workflow weblog instances. Attributes for search results are shown visually to assist the user in identifying differences in specified attributes.

As used herein, workflow means a defined collection of steps or a process that allows a user to manage and monitor activities, tasks and events related to a project or a specific goal. Workflows are intended to include business processes, activities, collections of tasks, to do lists and the like. All members assigned to the weblog have roles, or responsibilities, defined by one or more steps in the workflow for a specified duration or for an indefinite period. The completion of a workflow step or task is automatically logged in the weblog. The members contribute together in creating posts to the weblog by their normal participation in the workflow process. A role can be reassigned to a different member if the original member becomes unavailable to perform the related task. More than one role can be assigned to a member, and more than one member can be assigned to any role. The advantage to using a role-based approach is that the workflow is not required to change when people leave their assigned roles. Instead, new people are assigned to the otherwise vacant roles. People can also be assigned to roles as "backups." For example, backups can be identified to take over a role if the original member becomes unavailable or is on vacation. Access to the weblog is limited according to the role of the user in a particular instance of the workflow. Views of the weblog are also tied to the role. Members having certain roles can have access to all of the blog content whereas members with other roles might be able to see posts only relating to certain roles or tasks.

As workflow actions occur, such as the completion of individual steps or tasks in the workflow, the weblog system automatically posts entries in the weblog. In effect, the workflow weblog acts as a logging mechanism for the workflow where messages and updates are automatically generated and posted to indicate who completed what task and when the task was completed. Also, members assigned to roles can manually add postings to the weblog in the form of content, documents, links or images. Each member can maintain a personal weblog (i.e., member weblog) which can be configured to aggregate manual and automatic postings from multiple workflow instances and types. Consequently, members can collect and monitor their involvement within a process. Members can also make exception postings to the weblog. Exception postings relate to matters that may influence the execution of a workflow but are not defined in the workflow steps. Exception postings can take the form of a trouble ticket, requiring affirmative action before the ticket is "closed."

Advantageously, entries in the weblog can be fed to an aggregator along with entries from other weblogs, allowing oversight of multiple workflows and multiple instances of a workflow.

FIG. 1 shows an exemplary computing system 10 in which the method of the invention may be implemented. The computing system 10 includes a client device 14 such as a personal computer, Windows-based terminal, Network Computer, wireless device, workstation, mini-computer, cell phone, personal digital assistant (PDA) or other computing device that has hardware 18 such as a display screen, one or more input devices (e.g., keypad, stylus, keyboard, mouse, touch-pad, and trackball), a processor for executing application programs 22, and sufficient persistent storage for storing such application programs 22 and related information. One type of application program 22 that can be stored is a web browser, such as Internet Explorer™ and Netscape Navigator™, adapted for viewing and interacting with web pages stored on a server 26.

The web browser 22 executes within an operating system 30. Examples of operating systems supported by the client device 14 include Windows 3.x, Windows 95, Windows 98, Windows NT, Windows XP, Windows 2003, Windows CE, Macintosh, Java, LINUX, and UNIX. The client device 14 also includes a network interface 34 for communicating over a network 38. The network 38 can be a local-area network (LAN), a metro-area network (MAN), or wide-area network (WAN), such as the Internet or World Wide Web. Users of the client device 14 can connect to the network 38 through one of a variety of connections, such as standard telephone lines, LAN or WAN links (e.g., T1, T3), broadband connections (Frame Relay, ATM), and wireless connections (e.g., 802.11 (a), 802.11 (b), 802.11 (g)). The web browser 22 communicates with the server 26 located on the network 38 through the network interface 34, to download or extract content from web pages stored on the server 26 and to post entries into web pages stored on the server 26.

Figure 2:
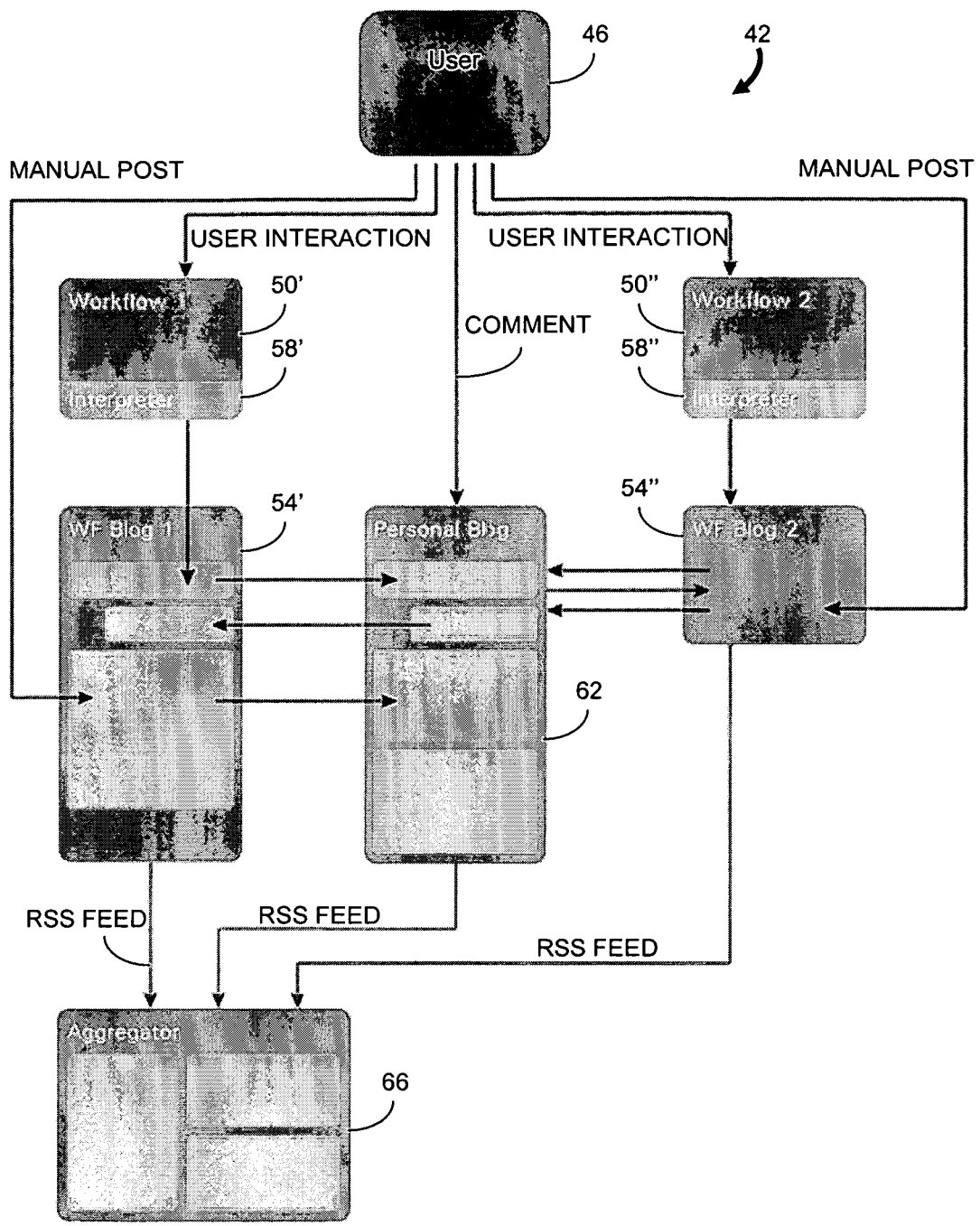
FIG. 2 is a block diagram of an embodiment of a system for tracking the status of multiple workflows according to the invention.

Referring to the functional block diagram shown in FIG. 2, an embodiment of a system 42 for tracking the status of a workflow according to the invention includes a user 46 interacting with two workflow instances 50' and 50" (generally 50). The two workflow instances 50 can be based on the same workflow template. Alternatively, each workflow instance 50 can correspond to a different workflow template. In another option, at least one of the workflow steps is defined upon instantiation of a respective workflow weblog 54' or 54" (generally 54). The workflow steps can be redefined as the particular workflow instance 50 is performed. In addition, one or both of the workflow instances 50 can be part of a greater workflow or can be the parent of one or more subsidiary workflows.

Each workflow weblog 54 can include a blogroll, i.e., a collection of links, or references, that point to other workflow weblogs or other syndicated feeds, such as personal weblogs, company news feeds and the like. The blogroll can include manual entries made by the user 46 and automatic entries made during execution of the respective workflow 50. The entries can link to parent workflows or subsidiary workflows or other postings in a given workflow. The state of the linked workflow instance 50 can be presented in the blogroll and is updated through the use of trackbacks. Trackbacks are based on a short message reply or ping received from the linked workflow or a user to update the state information.

Each workflow instance 50 communicates with the respective weblog 54 through an interpreter 58. The weblogs 54 can be included within other weblogs or refer to other weblogs. Although only two workflow instances 50, two weblogs 54 and two interpreters 58 are shown, the invention contemplates any number of these components. As illustrated, the user 46 can post directly to a personal weblog 62 (i.e., member weblog). Each workflow weblog 54 is configured for communication with the personal weblog 62 and an aggregator 66. The personal weblog 62 can also communicate with the aggregator 66.

When the user 46 interacts with one of the workflow instances 50, a logging entry is generated. The logging entry is processed by the interpreter 58 and is forwarded for inclusion in the corresponding workflow weblog 54. Processing by the interpreter 58 includes translating raw events triggered in the workflow instance 50 into an XML weblog entry format or other standard weblog entry format that is human readable. The entry is then copied to or referenced in the user's personal weblog 62. Entries in the personal weblog 62 generated by different workflow weblogs 50 can be distinguished by color or content for easy recognition. Similarly, manually generated postings and automatically generated messages can be displayed in different colors or contain signifying marks such as graphical icons. Moreover, entries made according to a specific role can share the same color so the user 46 can easily recognize the contributor.

In addition to a workflow generated entry, the user 46 can manually post an entry (e.g., comment) in the workflow weblog 54. Alternatively, the user 46 can comment by posting an entry in their personal weblog 62. Depending on the functionality implemented in the personal weblog 62, an entry is not necessarily linked to or copied to the corresponding workflow weblog 54. Some companies and organizations may wish to limit the posting of entries to automatic posting. Furthermore, companies and organizations may prohibit members from maintaining personal weblogs 62.

As described in more detail below, individuals outside the scope of the workflow instance 50 may be able to manually post entries in the workflow weblog 54 if they have access rights. For example, a director or manager may not fulfill a role in the workflow instance 50 but may still be granted permission to post if the director or manager supervises any of the members in the workflow instance 50. In addition, anyone aggregating the workflow weblog 54 has rights and, therefore, can manually post a comment.

Each of the weblogs 54, 62 can be configured to produce RSS (Rich Site Summary or RDF Site Summary) feeds. The RSS feeds are subscribed to by the aggregator 66. Thus the aggregator 66 can receive notifications and updates from a number of workflow instances 50. The aggregator 66 organizes the information provided in the RSS feeds according to workflow types, roles, workflow members, or other parameters included in the RSS feeds. In addition, the aggregator 66 polls the RSS feeds to determine newly added items for presentation to an aggregator user. In one example, an aggregator 66 is used to copy the first few text lines of an entry. In another example, the aggregator 66 acts as a miniature webbrowser and copying does not occur. Instead, the entries are viewed directly from downloaded web pages.

The use of a workflow weblog 54 to track the status of an instance of a workflow has many advantages. A major benefit is the ability for easy collaboration by participants in a business process and centralizing all resources and communication for a given workflow instance. Auditing is more easily accomplished in comparison to typical record searching and employee discussions for determining status. Accountability is improved as employees assigned to specific roles must "check off" completion of workflow steps. Entries can thus be traced to the responsible members. For roles that change over time, entries are created as shifts in users occur. This enhances auditing and accounting capabilities. In addition, the workflow weblog 54 organizes information according to when the step to be completed occurs in the overall workflow so an auditor knows where to look for relevant entries. Importantly, the volume of e-mail between individuals that relates to the workflow is reduced and relevant workflow information is centralized.

There is no special expertise required to generate the weblog and to make entries as software for these functions is readily available. Thus the need for special skills and training to use a collaborative tool is eliminated. There are no restrictions to the visual format of entries posted to the weblog 54. The weblog 54 can be accessed using any system or device that has a web browser capability. For example, an employee away from the office can view entries on various portable devices (e.g., personal digital assistants (PDAs) and cell phones). Access to the weblog 54 can be limited to users defined in the workflow 50, such as users having specific roles and specified management personnel as described in more detail below. The views of the weblog data depend on their role. Users can post entries to the weblog 54 using PDAs, cell phones, web pages, e-mail programs, instant messaging programs, and custom applications. Entries that can be posted include text, links, and other content. A wide range of options are available for making entries, including HTML forms, e-mail, chat programs, and custom interfaces. Weblog software processes the entries for posting and RSS aggregation, thus the user 14 is relieved of many of the tasks and effort previously required for publication.

The following description is an illustrative example for tracking the status of a workflow and is based on an automobile dealership. The dealership receives new cars from an affiliated supplier. The dealership maintains a workflow detailing steps to be performed for each car delivered by the supplier. Once the dealership receives confirmation of a new delivery, the general manager of the dealership initiates the workflow to process the delivery—a "receiving a car" workflow. The workflow includes various steps or actions to be performed such as assigning a stock number, completing a predelivery inspection (PDI), updating an inventory database, and handling exceptions or actions not described within the workflow.

Various employees at the dealership are assigned as members with specific roles in the workflow. For example, when the general manager launches the workflow, the lot manager is notified of the delivery on a PDA or similar device. The lot manager is responsible for the stock number step in the work and thus matches the vehicle identification number (VIN) and assigns a stock number to the new car using the PDA. The service manager is alerted when the lot manager has completed the assigned tasks so the service manager can begin the task of completing a PDI checklist. The general manager can examine the workflow at any time to determine its status and to see who has performed what task and when the task was performed. The general manager can see if tasks are being completed on time or if there are delays or problems. The dealership's supplier may have access to the workflow weblog and related workflow weblogs through an RSS aggregator in order to monitor matters for which the supplier may be responsible.

As previously described, exceptions can arise that are not routinely handled by the workflow. In the receiving a car workflow in the automobile dealership example, an exception can be a damage report indicating that damage has been detected on a received car. Generating a damage report includes initiating an exception workflow. The exception workflow launches its own weblog. This exception weblog is referenced by or linked to the main weblog (i.e., the receiving a car workflow weblog) for the process. The main weblog may require a trackback message, or ping, before continuing with subsequent steps in the workflow. The trackback allows later entries responsive to the damage report to go to the proper place in the weblog. Without the trackback feature, an auditor may have to view numerous entries made after the damage report to determine whether the damage report was completed. Once the exception workflow weblog is completed, the main weblog resumes its steps and logs the exception workflow as a step in this instance. For example, once the damage report is completed, the service manager is alerted and allowed to proceed with a pre-delivery inspection of the car.

Figure 3:
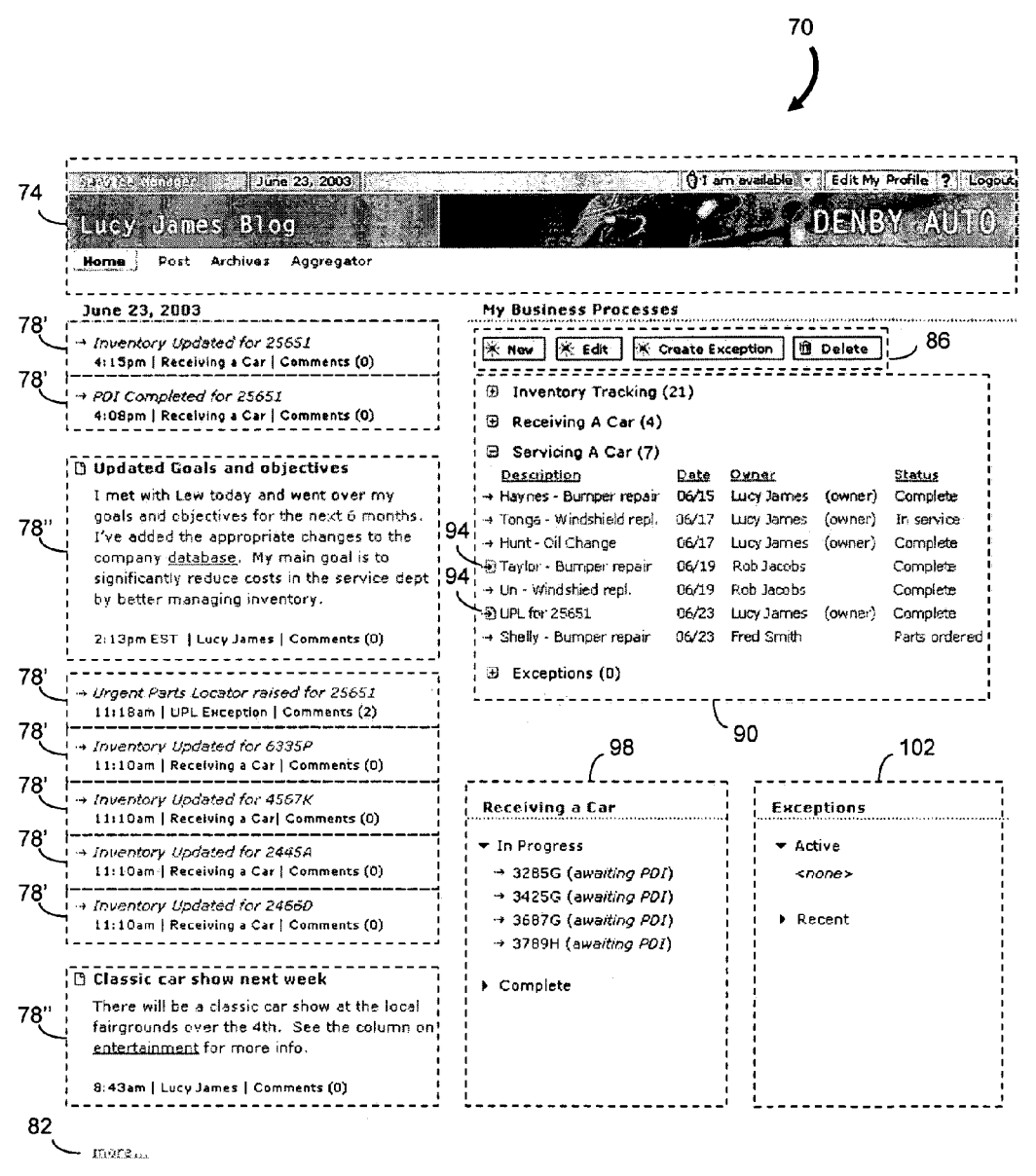

FIG. 3 depicts a personal weblog 70 belonging to a member of multiple workflows. The weblog 70 includes a header 74 that identifies the member (Lucy James), the member's role (service manager) and the organization (Denby Auto). The header 74 also provides the member the ability to create a manual post, to display archived entries and to display aggregator feeds. The left side of the weblog 70 displays automatic entries 78' and manual entries 78" (generally 78) to the weblog 70 in chronological order with the most recent entry being closest to the top of the weblog 70. To see additional entries 78, the member selects "more" 82 at the bottom left portion of the weblog 70.

Each entry 78 shows the posting time, the source or author, and the number of posted comments relating to the entry 78. Workflow entries 78 show the workflow step, time of completion and the workflow name. Because the member is a service manager at an automobile dealership, automatic entries 78' in the weblog 70 typically relate to her tasks in a particular workflow, such as inventory updates and pre-delivery inspections (PDIs). Workflow steps are automatically logged in the weblog as they are completed. Entries 78" manually posted by the member can also relate to dealership matters, or may be personal in nature and not available for viewing by others in other weblogs.

At the top right portion of the weblog 70 below the header 74 is a set of selection buttons 86 that allow the member to add a new business process (or workflow), edit an existing business process or delete an existing business process. All members of the process will be able to see these new postings, and edits. The member can also create an exception posting, such as a trouble ticket, for matters that are not defined in a business process. Pending business processes 90 are displayed according to groups. There are 21 inventory tracking processes, four processes relating to receipt of new cars and seven processes relating to servicing cars. As illustrated, the view of the pending business processes 90 includes an expanded view of the car servicing processes. Each car servicing process shows the start date, the person that initiated the process, a brief description and the current status of the process. The word "owner" indicates that the member is the person that initiated the car servicing process. Two business processes 94 are displayed with an additional symbol to indicate that there is at least one related comment entry. At the bottom right portion of the weblog 70 are expanded views 98 and 102 of two business process groups. These expanded views 98, 102 are established by the member for automatic display regardless of content. Typically the automatic expanded views 98, 102 relate to the more critical business processes that are of special interest to the member.

Figure 4:
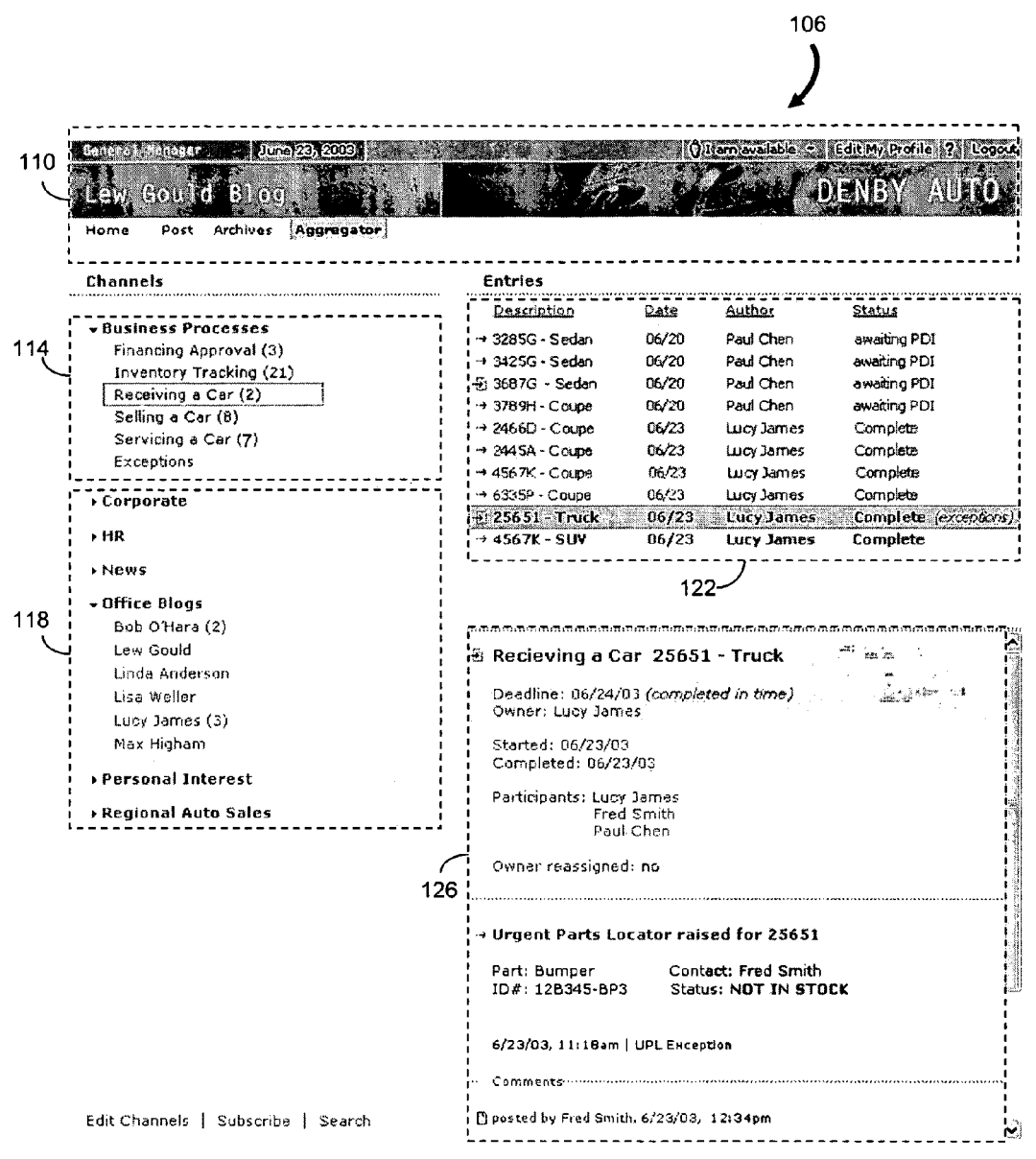

FIG. 4 depicts an aggregator view 106 of a member (Lew Gould) who is general manager of the automobile dealership. The general manager may not be a direct member of many, or perhaps even all, of the workflows identified in the aggregator view 106, however, the general manager still is permitted access based on assigned privileges. The aggregator view 106 includes a header 110 showing that the member has elected to display the aggregator view 106. The left side of the aggregator view 106 includes an expanded view 114 of business processes being monitored by the general manager, with the number in parentheses indicating the number of new entries for the respective process group. The view 118 below lists other channel groups (i.e., groupings of feeds) of interest to the general manager, including dealership feeds, personal (office) weblog feeds, and personal interest feeds derived from sources unrelated to the dealership. Optionally, the general manager can select (i.e., click on) a channel group to obtain all the entries even though there may be subcategories within the channel group.

In the right portion of the aggregator view 106 is an expanded view 122 of workflows related to receiving a car. The two unread entries are referenced by bold text. Just below is an expanded view 126 of the highlighted entry above. The expanded view 126 does not display all the information for the highlighted process but instead shows a summary of the process that includes the most recent entries.

Role-Based Views Access

As referenced above, access to the workflow weblog can be limited to specified users or individuals having one or more roles defined within the workflow. The user is made aware of a workflow weblog through a process portlet or tasks portlet in their teamspace using an application such as IBM Lotus Workplace (IBM Corporation, Armonk, N.Y.) where the workflow appears. Generally, only people assigned to an instantiation of a workflow can view the associated workflow weblog. They may also have specific views of the weblog based on their role. All postings include the name and role of the person making the entry, and the duration of the role assignment. Although a person can have multiple roles in the workflow, each posting includes a particular role associated with the person so that users can understand the context of the posting. Other individuals assigned to the workflow and therefore allowed access to the weblog can post comments that do not relate to their role. Similarly, people having access to the weblog can perform tasks assigned to others, although the name and role of the person performing the task is recorded in the weblog. Consequently, there exists a record of which individuals performed certain tasks and in what capacity the tasks were performed. People acting outside of their assigned roles can be beneficial, for example, if their actions help to complete the workflow or if their actions "cover" for an absent member of the workflow. In other instances the weblog can indicate when individuals act outside of their capacity in an inappropriate manner. Users can be invited to join a weblog as a guest such as a domain expert or specialist. Access and views are determined by the process owner according to what matters and steps the expert is expected to review and provide comments. Such access can be granted in an ad hoc manner or for a longer duration.

Individuals that do not hold a role in a workflow are generally prohibited from accessing the workflow weblog, however, if a person has need to participate in the weblog, the "process owner" or an individual with administrative privileges can add the person as an external participant to the weblog. The external participant joins as a guest and is "visible" to all members of the weblog. Examples of external participants include consultants, contractors and customers.

In the context of a meeting workflow, when an instance of a meeting is created, different people are assigned to each role according to the roles defined for that particular workflow. Each instance of the meeting is unique. A meeting can be, for example, a particular instance of a monthly staff meeting (monthly staff meeting workflow) or an interdepartmental research meeting (research meeting workflow). The following description includes two examples of instances of a process for managing online meetings in which access and views to an associated workflow weblog are controlled according to an embodiment of the invention. The process includes steps such as organizing the meeting, conducting the meeting and performing follow-up tasks. The workflow definition includes assigning people to each role in each step for a certain duration. Sometimes more than one person is assigned to a role. Conversely, more than one role can be assigned to a person. In these examples, persons are assigned one or more of the following roles for specified durations: meeting moderator, meeting organizer, meeting assistant, e-meeting scheduler, note taker and other meeting roles.

Figure 5A:
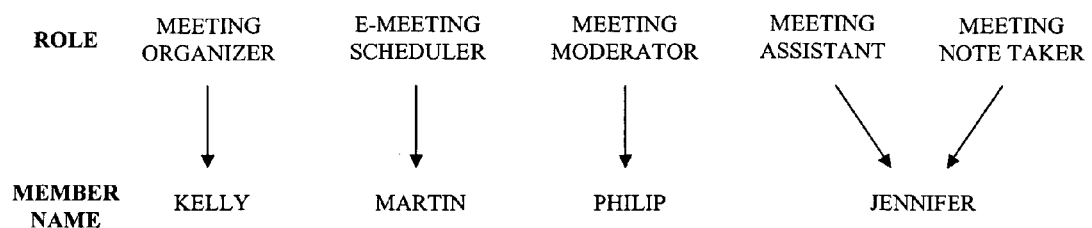
FIG. 5A depicts the assignment of roles to members of a workflow instance.
Figure 5B:
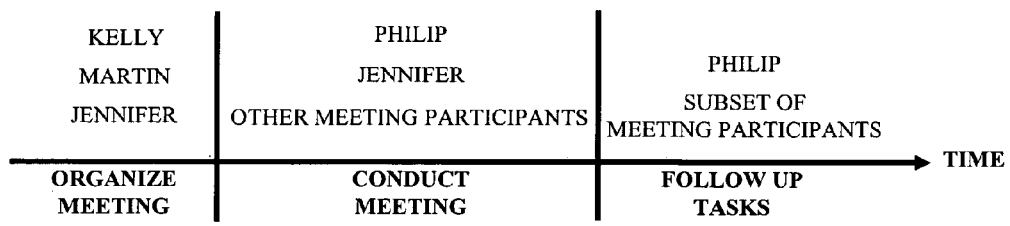
FIG. 5B depicts weblog access and viewing rights of the members of the workflow of FIG. 5A over time.

Referring to FIG. 5A as an example of a monthly staff meeting, role assignments include Kelly as the meeting organizer, Martin as the e-meeting scheduler and Philip as the meeting moderator. Jennifer is assigned the role of meeting assistant and the role of note taker. Based upon the role assignments, Kelly is the only person allowed to add items to the agenda. Philip has the initial permission to conduct the meeting, including choosing which agenda items to open and which online meeting tools to utilize. Jennifer has the initial write permissions for the online meeting minutes. FIG. 5B illustrates weblog access and viewing rights for members of the workflow as assigned in FIG. 5A. Rights are based on the specified durations of the assigned roles. More specifically, during the organizational period preceding the meeting, Kelly, Martin and Jennifer in their roles as meeting organizer, e-meeting scheduler and meeting assistant, respectively, would require access to the weblog and during the meeting Philip, Jennifer and the other meeting participants would at least have viewing rights to defined portions of the weblog. However, the type of access to the weblog can be different for each person. For example, Jennifer acting in the role of note taker can be allowed to post the minutes of the meeting but she may be prohibited from viewing certain exhibits or other information available through the weblog to other meeting participants. Moreover, after the meeting is concluded and the workflow enters the follow up task stage, tasks associated with the roles of the meeting organizer, scheduler, moderator, assistant and note taker are generally completed. Thus the person associated with each of these roles can be prohibited from viewing part (e.g., the meeting minutes) or all of the weblog depending on the particular role or roles assigned to each member.

Figure 6A:
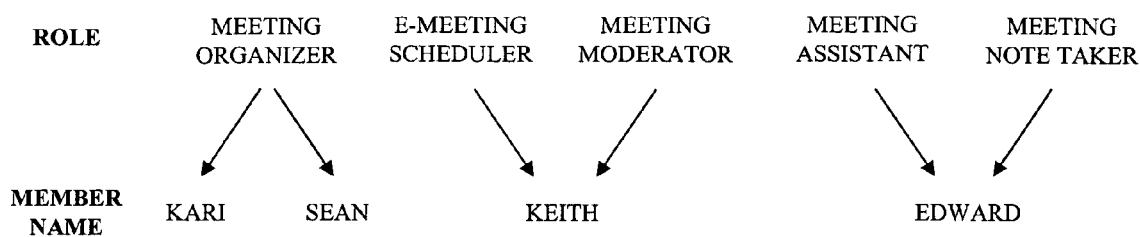
FIG. 6A depicts the assignment of roles to members of another workflow instance.

Referring to FIG. 6A as an example of an interdepartmental research meeting, Keith is assigned to be the meeting moderator as well as the e-meeting scheduler and Edward is assigned to be the meeting assistant as well as the note taker. The role of meeting organizer is shared by two members, Kari and Sean, who represent different departments. Advantageously, sharing the responsibility for organizing the meeting allows both departments to ensure that the meeting addresses their respective topics or concerns.

Task completion results in automated posts to the weblog indicating the name and role of the person or persons completing the task and when the task was completed. All members of the process can post comments to the weblog. The name or username and the role of the member posting the comment are recorded with the comment. A member having more than one role in the process selects the role that best corresponds to the posted comment.

Figure 6B:
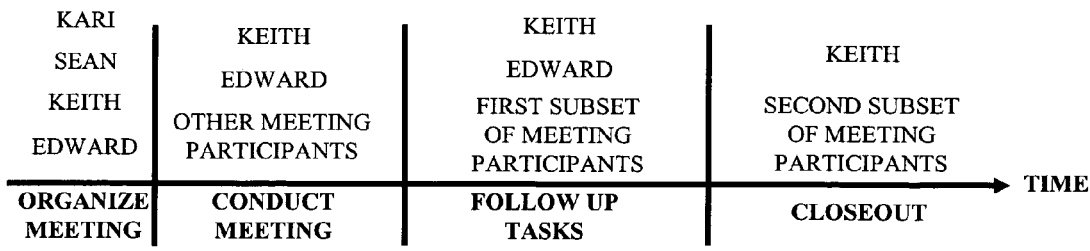
FIG. 6B depicts weblog access and viewing rights of the members of the workflow of FIG. 6A over time.

FIG. 6B illustrates weblog access and viewing rights for members of the workflow as assigned in FIG. 6A As with the previous example, rights are based on the specified durations of the assigned roles. As shown, the meeting organizers, meeting scheduler and meeting moderator are involved in the workflow during the organizational phase thus Kari, Sean Keith and Edward have the ability to post and/or view at least those portions of the weblog relevant to their roles. During the actual meeting, Keith acting as meeting moderator, Edward acting as meeting assistant and notetaker, and other specified meeting participants have access to relevant portions of the weblog for posting and viewing. Members previously having access to the weblog during the organizational phase may now be restricted in what they can view and/or post, or they may be prohibited from further access and viewing. After the meeting has ended, the workflow enters the follow up phase during which actions items defined in the meeting may be assigned to a subset of the meeting participants. Thus certain individuals such as Keith and Edward, along with those having responsibility for one or more action items, are allowed to post and/or view at least a portion of the weblog. As the workflow enters it final stage, or "closeout" phase, only Keith and a smaller subset of meeting participants are allowed to post and/or view relevant portions of the weblog.

In conventional weblogs, people can view all postings and users. According to the invention, access to a weblog, including the ability to view various portions of the weblog postings and data (i.e., views), can be limited according to the role of the user in the workflow instance as described in the above examples. In another example, a workflow can involve company employees and clients of the company. The clients may be provided access to automated messages and postings from members having certain roles in the workflow but be prohibited from viewing postings from other workflow members. Moreover, usernames may be omitted from the viewable postings. In another embodiment, certain entries can be viewable to people designated in the workflow as managers or "high level" employees, or who otherwise are granted special access rights based upon their relationship to the people fulfilling a role in the workflow even though such people may not have a workflow role.

The following description is an example of access and view control to a company workflow weblog. Company A (i.e., the seller) is attempting to sell a product to Company B (i.e., the customer). The sales process of Company A includes conducting multiple meetings with employees of Company B, providing a demonstration of the product, permitting Company B to use a working prototype of the product for a limited time and supporting a question and answer forum for a certain period. A workflow weblog is initiated to track all activity and communication in the sales process. An employee of Company B posts a question about the product in the weblog. The customer can view all communications in the weblog from one or more designated contacts in the sales team of Company A but cannot see any communications from other employees of Company A posted in the weblog based on roles. If a sales person needs to talk to someone in the role of engineer or technical support for assistance in responding to a question from Company B, the engineer or technical support staff member posts an answer to the question to the weblog. Advantageously, all sales related communications are stored in the weblog but the customer is not allowed to view postings from the engineers or technical support staff member. Responsive information passed on to the customer is posted by one of the designated sales contacts.

The ability to create and modify blogroll entries can also be based on the role of a member or on a relationship of the person to someone fulfilling a role in the associated workflow. For example, editing of content that was authored in a particular role can be limited to people having the same role. In addition, viewing and aggregation of blogroll entries (e.g., RSS feeds) can be controlled according to roles. Syndication can be filtered by privileges associated with a role or a relationship to a person having a role in the workflow.

In one example, an employee completing a trip expense workflow may see a blogroll entry linking the employee to the annual travel workflow of their division in a company. The employee's manager can decide to fund the trip from a discretionary account. A link to a discretionary account workflow can be shown in the manager's weblog view but not in the employee's weblog view of the same process.

Access to workflow weblogs can be controlled based upon time according to the specified duration (if any) of role assignments. Upon the expiration of a person's role in a workflow, the person can be prevented from accessing the weblog. Preferably, the person retains read access to any content for which the person previously had access based upon a prior role and thus was responsible for performance of certain tasks and expected results. A person fulfilling a role can be provided user access to previous weblogs involving that role even if the members fulfilling the role are different across instances of the workflow. Because a role can be time-dependent, role status is updated real time to indicate the current role assignments for the workflow. Any changes to the roles, tasks and assignments are determined and access rights are changed accordingly. Members are notified of any changes to their access rights and what they are permitted to view. Once a role is assigned to a different individual, that person also gains access to all current and related instances.

Teaching hospitals present an environment in which medical care is the shared responsibility of a team of people including an attending staff member, specialists, residents, nurses, managers and other medical staff. Several shift changes typically occur while a patient is hospitalized for more than 24 hours. Each shift change involves the transfer of tasks and responsibilities. In addition, medical professionals and staff can rotate through different services (e.g., outpatient, inpatient and emergency room services) for defined intervals. Interns and Residents rotate through departments on an academic schedule. To ensure a smooth transition, ongoing care, and adherence to treatment policies and regulatory standards (e.g., the health Insurance Portability and Accountability Act (HIPAA) and Food and Drug Administration (FDA) for clinical trials or new interventions), the weblog tracks all activity, shift changes, new assignments, transfers and rotations. Staff starting a shift in a new role or resuming a previous role see all relevant data appropriate to their role. Such role-based view and access control to medical information in a weblog format protects a patient's privacy as directed by law. The weblog maintains a record of who performed a task and in what capacity (i.e., role), and the time during which the task was performed or completed. All patient-related activity relevant to the workflow is logged, including accounting, health insurance and research data which are recorded along with other services provided to the patient. Unauthorized users are unable to view the weblog and workflow members are prevented from acting outside their assigned roles.

Attribute Visualization

A user can search workflow weblogs with reference to various workflow components. Search results can be displayed with attributes (i.e., weblog characteristics associated with each weblog) in text format. The displayed results often make it difficult for the user to visually track aspects of the weblog. Such aspects include blog rolls, trackbacks and comments in postings. For example, the user has to scroll down through the display to determine the number of comments for a given posting or to determine which posting has the most comments.

The present invention provides for the display of search results using modified graphical parameters to indicate certain attributes to the user. This "visualization" enables the user to quickly view and recognize attributes that satisfy a predefined condition. Such conditions can include defined minimum and/or maximum values. For example, the predefined condition may specify an acceptable range about a normal value or average value. The present invention also contemplates using the visualization method with other displays of workflow instances or workflow processes, such as status and notification presentations.

The visualization of weblog attributes is particularly advantageous when the weblogs are used as workflow audit trails or for workflow collaboration. In such instances, the number of collaborators can be large. Moreover, the number of workflows being tracked and weblogs being managed can appear excessive if visualization of relevant attributes is not implemented. Users can search prior workflow weblogs using a full text search of weblog data in combination with workflow data. By way of example, weblog data can include the authors, commenters, duration of the weblog, average time between postings, number of postings, size of the postings, blog roll and categories. Workflow data can include the roles, duration of the workflow process, average time to complete a workflow step, related workflows, outcome, affiliated departments, current status, size (i.e., number of lines, postings or comments), activity after workflow completion, frequency of use, blog roll size and track backs. Workflow data can also include the numbers of members, roles and exceptions. In some embodiments, the rights to perform searches or access certain weblogs in a search are limited according to the current or past roles of the user as described above.

Searches can be limited in scope to the aggregated content for an individual. In another option, searches can include archived workflow weblog entries. In one embodiment, a user selects a particular workflow instance and accesses all instances of the workflow. Alternatively, the user can limit the number of instances to be displayed. For example, the user can request a specified number of the most recent instances of the workflow for display.

Attributes of workflow weblogs can be highlighted and weighted in the search results. Utilizing the linked nature of workflow weblogs (i.e., blog rolls and trackbacks) in the search process allows a user to more readily navigate through past and current workflow instances. For example, a weblog with a high number of trackbacks can be assigned a higher relevance in the search results than other instances of the same workflow process. Similarly, workflow instances that appear on a high number of blog rolls can be assigned a higher search relevance.

Visualization of search results provides an alternative to database queries and long textual reports. Moreover, visual searching permits a user to compare weblogs in a convenient manner such as in a side-by-side presentation. This presentation style is particularly valuable when contrasting different workflow processes or when contrasting multiple instances of a specific workflow process. Specific attributes can be highlighted to indicate their deviation from similar attributes for other workflow processes or weblogs, or to indicate their value relative to specified values. For example, a manager can perform an advanced search for all expense accounts weblogs that occurred during a specified period. The text background of one or more attributes displayed for each expense account weblog that exceeded an associated budget and required special approval can be highlighted with a specified color (e.g., red). Consequently, the manager can quickly determine from the displayed attributes all the accounts that are over budget. The manager can then select and expand each highlighted weblog to view additional information.

In another example, the text background or text style of one or more displayed attributes is modified to visually distinguish weblogs having desirable or undesirable attribute values. For example, the displayed search results may include an attribute that indicates the number of exceptions for each weblog. The "exception attribute" is evaluated against a predefined conditions to determine the display status. The predefined condition is based on a range of acceptable values about an average value for the workflow. Exception attributes having values that lie within the acceptable range are displayed with a text background of one color (e.g., blue). If the number of exceptions for a weblog is less than the smallest acceptable value, the exception attribute is displayed with a green background indicating a desirable workflow instantiation. Conversely, if the number of exceptions is greater than the largest acceptable value, the exception attribute is displayed with a different color (e.g., orange) to facilitate recognition of the undesirable weblog instantiation.

Bringing specific attributes in the search results to the attention of a user allows the user to visually identify trends across a large number of workflow instances. For example, a manager in a software development company may want to review the history of "fixing bugs" for software engineers in the manager's group to determine which bugs required the longest fix time. In this example, a weblog is initiated for each instance of a bug fix workflow. The manager performs a preliminary visual review of the search results and sees that the bugs that took more time to fix generally had fewer engineers working on the fix. The manager can sort the search results by time to fix to confirm the conclusion.

The above described search techniques can be applied to determine best practices, i.e., learning from successful workflows, exceptions and trouble tickets. In one example, the visualization method is applied to online shopping instances. Attributes associated with shopping instances are visualized to emphasize those attributes that indicate departures from historical use or learned shopper behavior. Such instances may be associated with unauthorized use of credit cards.

Visually tracking the progress of workflows is beneficial when managing large numbers of workflow instances. For example, applying the visualization method of the present invention to surveillance data can be advantageous. Large volumes of communications (e.g., "chatter") monitored on a constant basis can be processed using visualization of the attributes to reveal when an extraordinary event is occurring or may be imminent. Determinations of extraordinary events can be based on conversations with durations longer than typical conversational durations, the presence of certain words or phrases that are suddenly frequently used in communications, and the like. Users see changes occurring in near real-time by studying the visualization of the aggregated weblog. Users can also review "old" information to identify attribute correlations or to determine why "mistakes" occurred.

Figure 7:
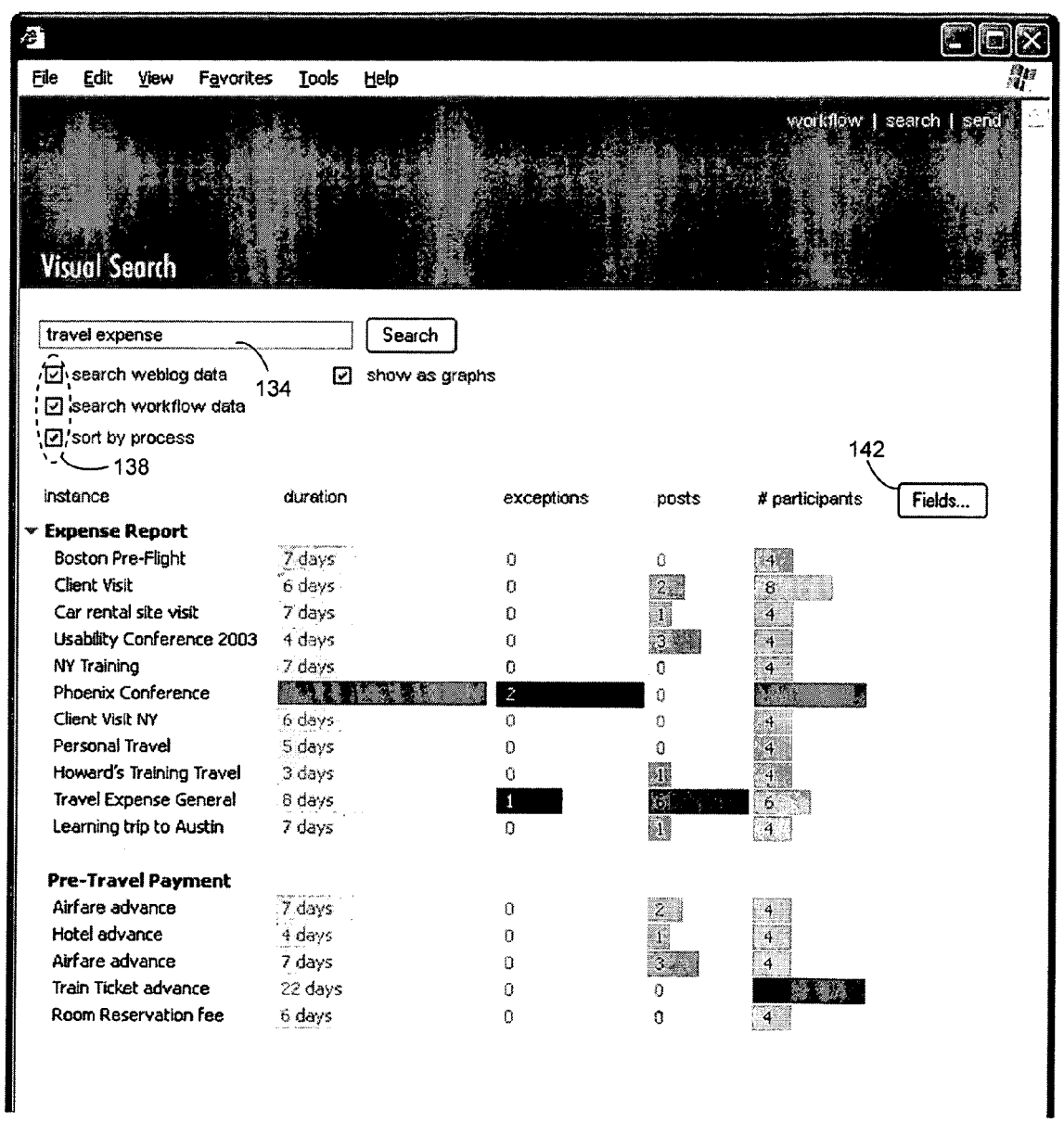
FIG. 7 shows an example presentation of search results with visualization for attributes for multiple instances of workflow weblogs in accordance with an embodiment of the invention.

FIG. 7 shows an example presentation 130 of search results with visualization for multiple instances of workflow weblogs in a "side-by-side" arrangement. The presentation 130 includes a search box 134 in which a user enters one or more keywords or phrases. Below the search box 134, the user selects boxes 138 to indicate that the search should include weblog data and workflow data, and that the results should be sorted according to workflow process. A "Fields . . . " button 142 at the right side of the presentation 130 allows the user to modify the fields (i.e., attributes) displayed for each of the weblog instances presented in the search results.

In the illustrated example, the user has searched for all instances that have a category attribute including at least one of the words "travel" and "expense". All weblog instances with a category attribute matched to at least one of the two search words (i.e., satisfying the search condition) are listed under the appropriate workflow category: "Expense Report" or "Pre-Travel Payment". Displayed attributes for each weblog include the duration, number of exceptions, posts and number of participants.

In other embodiments, the user searches for workflow instances using a different attribute and search condition or a combination of attributes are compared with one or more search conditions. In still other embodiments, a customized weighting of attributes is used to determine the order of the weblogs listed in the search results. For example, prior knowledge of desired attribute values can be sued to find and display instances that most closely match an "ideal instantiation" of the workflow.

Predefined conditions for each attribute are compared with the actual attribute values to determine how to generate the visualization. The attribute "duration" for each weblog instance is shown as text superimposed on a horizontal bar. The length of the horizontal bar is proportional to the duration of the instance. The duration of 22 days for the Phoenix conference is shown with a modified graphical parameter because the attribute satisfies a predefined condition (e.g., exceeds 10 days) assigned to the duration attribute. The exceptions, posts and number of participants attributes are also compared with respective predefined conditions and displayed with a modified graphical parameter if the respective condition is satisfied. Consequently, the user can easily and quickly determine instances that vary significantly from the other instances according to the displayed attributes.

The modified graphical parameter in the current example includes a change to the background color or shading for the displayed text. In other embodiments, the modified graphical parameter can include text modifications such as bolding, underlining, font size change, font color change, and the like. In still other embodiments, the modified graphical parameter can include a modified graphical structure associated with an attribute such as a block color change, a line thickness change, a blinking graphical structure, and the like.

Figure 8:
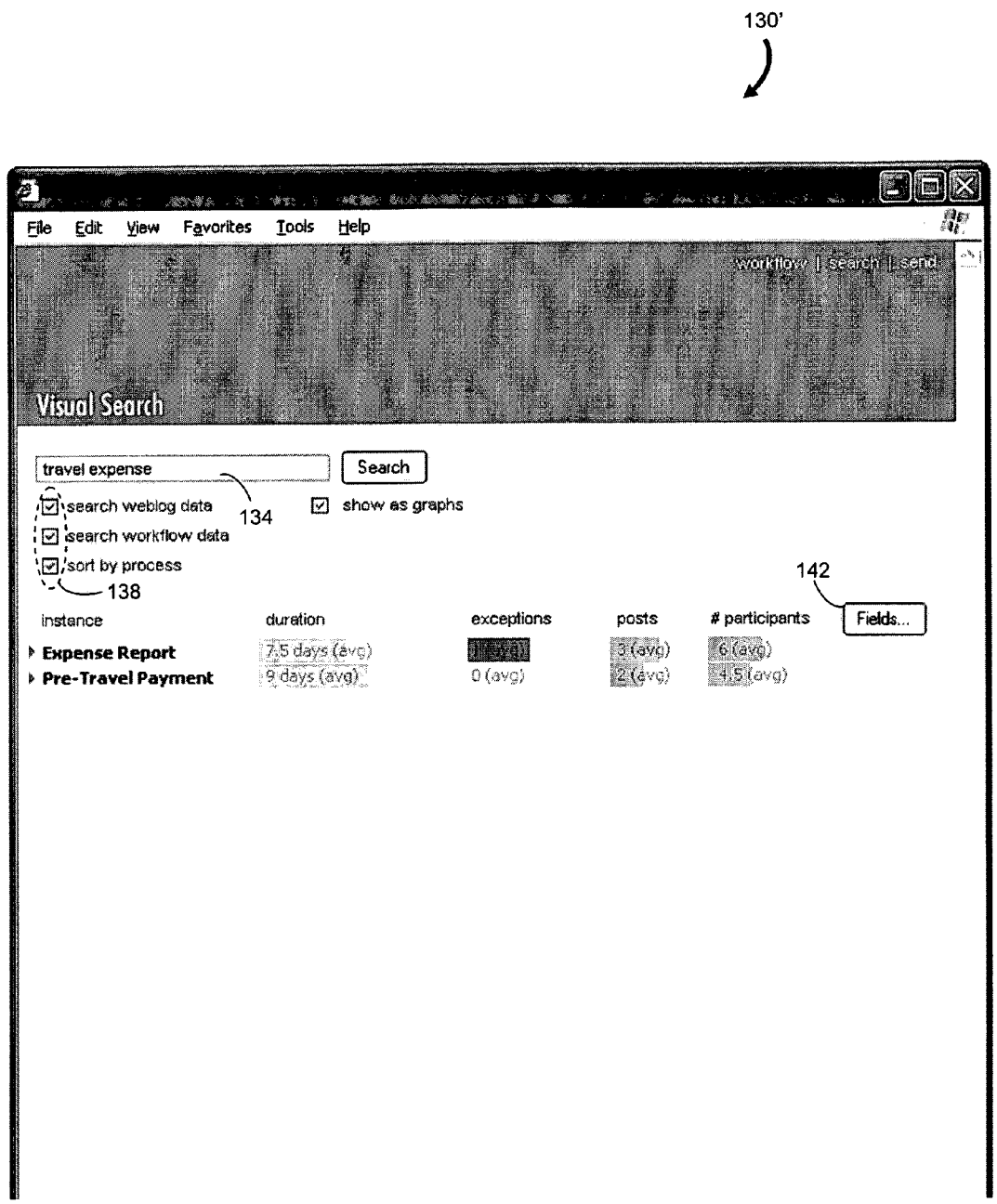
FIG. 8 shows an example presentation of the search results of FIG. 7 collapsed into workflow categories with visualization of summary attributes in accordance with an embodiment of the invention.

FIG. 8 shows the example presentation 130 of FIG. 7 in which the information is "collapsed" into summary attributes for each workflow category. The summary attributes are derived from the respective attributes associated with the weblog instances in each workflow category. In this example, the duration, exceptions, posts and number of participants attributes are displayed as averages. The summary attributes are displayed in a similar manner to the attributes of FIG. 7. In this presentation format, the user can quickly and easily compare workflow processes without regard to attributes associated with specific instances.

While the invention has been shown and described with reference to specific embodiments, it should be understood by those skilled in the art that various changes in form and detail may be made therein without departing from the spirit and scope of the invention.

What is claimed is:

1. A method for visualization of attributes of a workflow weblog, the method comprising:

determining and displaying from a group of workflow weblogs at least one workflow weblog having an attribute that satisfies a search condition, the at least one workflow weblog tracking the status of a workflow, the workflow including a collection of steps related to a process, wherein a completion of a step is logged in the workflow weblog, wherein entries in the workflow weblog are automatically generated and posted at the workflow weblog;

displaying a plurality of attributes for each displayed workflow weblog;

for each displayed attribute:

determining whether one or more events have occurred in the workflow by comparing a displayed attribute value corresponding to aggregated instances of the displayed attribute to a predefined condition; and displaying a modified graphical parameter that corresponds to the displayed attribute value that satisfies the predefined condition, wherein the attribute being displayed with a modified graphical parameter is a derivative of an attribute in a plurality of the workflow weblogs, wherein the modified graphical parameter comprises a modified graphical structure, wherein the displayed attributes for each workflow weblog are displayed in a listing ordered according to a value of the attribute.

2. The method of claim 1 wherein each workflow weblog in the group of workflow weblogs comprises an instantiation of the same workflow.

3. The method of claim 1 wherein the modified graphical parameter comprises a modified text.

4. The method of claim 1 wherein the modified graphical parameter comprises a modified graphical structure.

5. The method of claim 1 wherein the determination of the at least one workflow weblog comprises determining from a group of workflow weblogs at least one workflow weblog having a plurality of attributes each satisfying a respective search condition.

6. A non-transitory computer-readable medium encoded with program code comprising:

program code for determining and displaying from a group of workflow weblogs at least one workflow weblog having an attribute that satisfies a search condition, the at least one workflow weblog tracking the status of a workflow, the workflow including a collection of steps related to a process, wherein a completion of a step is logged in the workflow weblog, wherein entries in the workflow weblog are automatically generated and posted at the workflow weblog;

and program code for displaying a plurality of attributes for each displayed workflow weblog;

program code operable for each displayed attribute to:

determine whether one or more events have occurred in the workflow by comparing a displayed attribute value corresponding to aggregated instances of the displayed attribute to a predefined condition;

and display a modified graphical parameter that corresponds to the displayed attribute value that satisfies the predefined condition, wherein the attribute being displayed with a modified graphical parameter is a derivative of an attribute in a plurality of the workflow weblogs, wherein the modified graphical parameter comprises a modified graphical structure, wherein the displayed attributes for each workflow weblog are displayed in a listing ordered according to a value of the attribute.

7. The non-transitory computer-readable medium of claim 6 wherein each workflow weblog in the group of workflow weblogs comprises an instantiation of the same workflow.

8. The non-transitory computer-readable medium of claim 6 wherein the determination of the at least one workflow weblog comprises determining from a group of workflow weblogs at least one workflow weblog having a plurality of attributes each satisfying a respective search condition.

* * * * *